(12) United States Patent
Ketchum et al.

(10) Patent No.: US 8,874,740 B2
(45) Date of Patent: Oct. 28, 2014

(54) CUSTOMER EXPERIENCE MONITOR

(71) Applicant: FMR LLC, Boston, MA (US)

(72) Inventors: Thomas Ketchum, Wrentham, MA (US); Sampath Deva, Bedford, NH (US); Andy Fagan, Marlborough, MA (US); Robert Herring, Nashua, NH (US); David Danneker, Mansfield, MA (US); Lawrence E. Jarvis, Rehoboth, MA (US)

(73) Assignee: FMR LLC, Boston, MA (US)

( * ) Notice: Subject to any disclaimer, the term of this patent is extended or adjusted under 35 U.S.C. 154(b) by 66 days.

(21) Appl. No.: 13/734,332

(22) Filed: Jan. 4, 2013

(65) Prior Publication Data

US 2014/0195667 A1   Jul. 10, 2014

(51) Int. Cl.
*G06F 15/173*   (2006.01)
*H04L 12/26*   (2006.01)

(52) U.S. Cl.
CPC ............ *H04L 43/045* (2013.01); *H04L 43/067* (2013.01)
USPC .......................................... 709/224; 709/223

(58) Field of Classification Search
CPC ......... G06F 9/542; H04L 12/24; H04L 41/00; H04L 41/06; H04W 24/08
See application file for complete search history.

(56) References Cited

U.S. PATENT DOCUMENTS

| | | | |
|---|---|---|---|
| 6,874,099 B1 * | 3/2005 | Balasubramanian et al. | 714/4.1 |
| 7,051,098 B2 * | 5/2006 | Masters et al. | 709/224 |
| 8,224,624 B2 * | 7/2012 | Cherkasova et al. | 702/182 |
| 2002/0107958 A1 * | 8/2002 | Faraldo, II | 709/224 |
| 2003/0200486 A1 * | 10/2003 | Marwaha | 714/39 |

\* cited by examiner

*Primary Examiner* — Peling Shaw
(74) *Attorney, Agent, or Firm* — Gesmer Updegrove LLP

(57) ABSTRACT

A network monitoring system is provided that includes a plurality of tiers being arranged in a network having a plurality of hardware and software resources for executing a selective number of applications. The tiers include disparate technology stack formats. A platform resource receives monitoring information from the tiers in their respective disparate technology formats and stores the monitoring information where the monitoring information is normalized into a format that is universally recognized. An aggregation presentation module aggregates and analyzes the monitoring information from the platform resource to determine if there are any anomalies of the hardware and software resources, and formats the monitoring information to be presented as selected real-time performance analytics to a user.

18 Claims, 5 Drawing Sheets

CUSTOMER EXPERIENCE MONITOR

BACKGROUND OF THE INVENTION

The invention is related to the field of network monitoring systems, and in particular to a customer experience monitoring (CEM) system providing a single integrated view to the end-to-end technology health of a business transaction.

Customers or end users interact with systems through interfaces (known as applications). When a customer interacts with an application that interaction typically travels through many layers of infrastructure. Enterprises use a variety of tools to monitor the customer experience and associated infrastructure to ensure availability and performance. Applications are becoming increasingly interconnected and continue to get more complex driven by a number of factors from virtualization, service oriented architecture, cloud, rich internet application design, to cross device integration. So, a need for end-to-end view of customer experience is growing. The invention addresses this gap.

There are a number of tools in the market place that provide application and infrastructure monitoring at various layers. Most vendors require installation of their tools across the entire end-to-end path to get true end-to-end customer experience monitoring. Vendors do not have open architecture to allow other vendor products feed data or do not have a customer perspective when tying metrics end-to-end. The data generated from tools today are presented in a disparate fashion resulting in inadequate correlation of data between the tools and with customer experience requiring manual intervention or institutional knowledge to take further action.

SUMMARY OF THE INVENTION

According to one aspect of the invention, there is provided a network monitoring system. The network monitoring system includes a plurality of tiers being arranged in a network having a plurality of hardware and software resources for executing a selective number of applications. The tiers include disparate technology stack formats. A platform resource receives monitoring information from the tiers in their respective disparate technology formats and stores the monitoring information. The platform resource includes a common database schema, where the monitoring information is normalized into a format that is universally recognized. An aggregation presentation module aggregates and analyzes the monitoring information from the platform resource to determine if there are any anomalies of the hardware and software resources, and formats the monitoring information to be presented as selected real-time performance analytics to a user.

According to another aspect of the invention, there is provided a method of performing network monitoring. The method includes arranging a plurality of tiers in a network having a plurality of hardware and software resources for executing a selective number of applications. The tiers include disparate technology stack formats. Also, the method includes receiving monitoring information from the tiers in their respective disparate technology formats and storing the monitoring information using a platform resource. The platform resource includes a common database schema, where the monitoring information is normalized into a format that is universally recognized. In addition, the method includes aggregating and analyzing the monitoring information stored in the platform resource using an aggregation presentation module to determine if there are any anomalies of the hardware and software resources, and formats the monitoring information to be presented as selected real-time performance analytics to a user.

DETAILED DESCRIPTION OF THE INVENTION

The invention provides a single integrated view to the end-to-end technology health of a business transaction. It integrates and correlates data from multiple sources to provide a single status. A consolidated end-to-end graphical view of a business transaction and the technology it traverses is displayed to operations personnel and proactive status of any issues is displayed for research.

Managing and monitoring business transactions that users execute requires the correct execution by multiple disparate software technology stacks as well as multiple computer hardware types. Support responsibilities are taken by multiple different engineering teams, each who clearly understand the technology they support. Each team potentially uses different tools to understand the stability and availability of their technology. These teams speak somewhat different technology languages but together have a need to communicate as a group. The invention permits the ability to work across disparate monitoring technologies.

Figure 1:
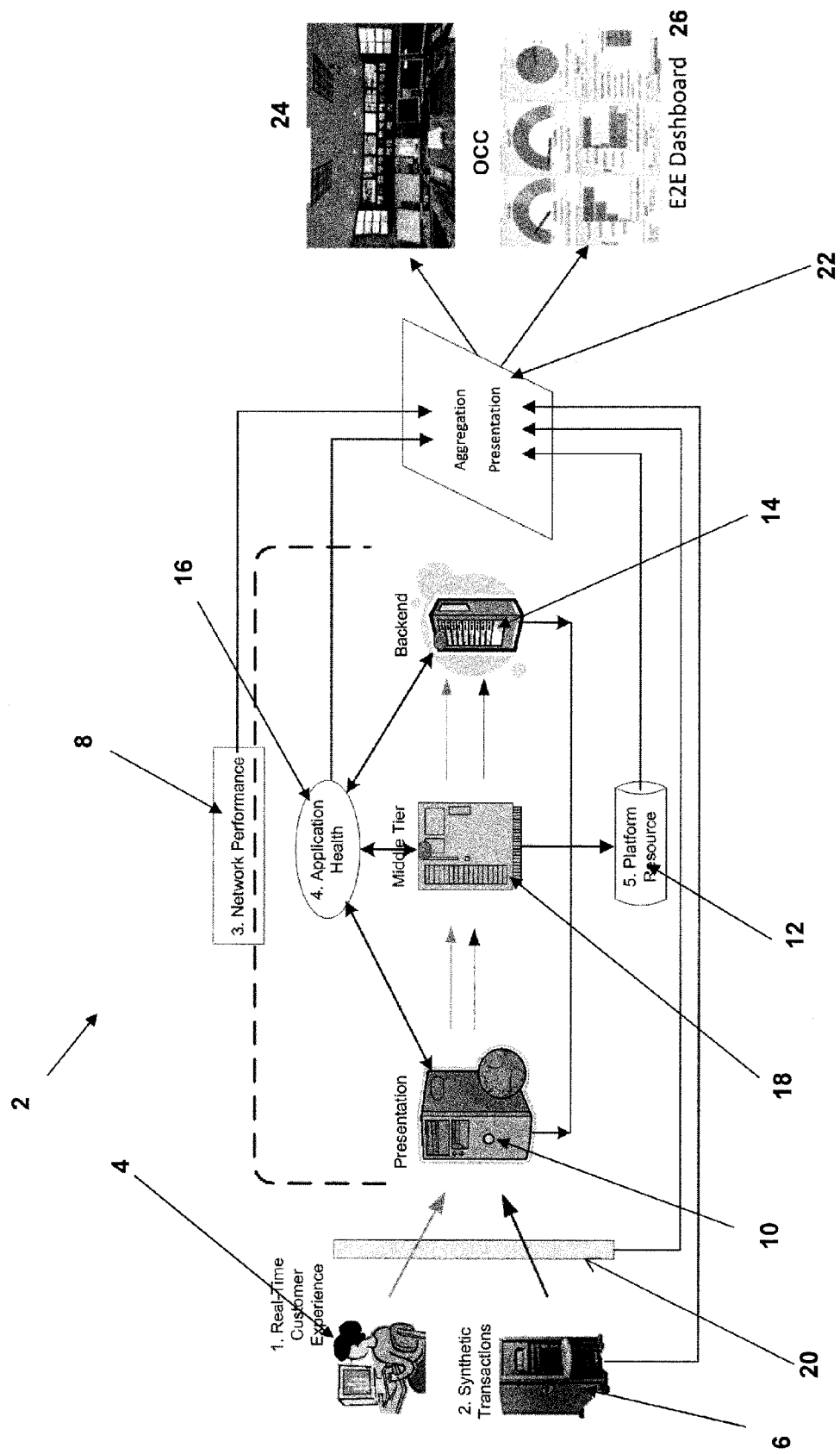
FIG. 1 is a schematic diagram illustrating a general framework of a CEM system in accordance with the invention.

FIG. 1 is a schematic diagram illustrating a general framework of the CEM system 2 in accordance with an exemplary embodiment of the invention. The CEM system 2 monitors the interaction in real-time of a customer 4 or synthetic transactions 6 produced by a remote server. Transactions produced by the customer 4 or synthetic transactions 6 are passed thru a firewall 20. The firewall 20 is responsible in protecting the integrity of the information being sent by the customer 4 or the synthetic transactions 6 to a presentation tier 10 as well as load balancing. The presentation tier 10 includes a web server or browser. The customer 4 and synthetic transactions 6 interact with the presentation tier 10 that includes logic for displaying information to the customer 4 or provide information to the synthetic transactions 6. When the presentation tier 10 determines a service request from either the customer 4 or synthetic transactions 6 requires further processing, the presentation tier 10 sends a request to a middle tier server 18 for further processing.

The middle tier server 18 performs the necessary application functionality needed for detailed processing. The middle tier server 18 can be considered an application server. In particular, the middle tier server 18 is a server that provides software applications with services such as security, data services, transactions support, load balancing, and management of large distributed systems. In certain embodiments of the invention, the middle tier server 18 can be web servers that support the Java Platform, Enterprise Edition; however, its use isn't restricted to Java.

A backend tier 14 is provided that receives requests from the middle tier 18 for managing computer data storage logic. In particular, the backend tier 14 includes database servers where information is stored and retrieved. This tier 14 keeps data neutral and independent from the middle tier server 18. Giving data its own tier improves scalability and performance.

Network performance 8 of this framework 2 depends heavily on the interactions of the presentation tier 10, middle tier 18, and backend tier 14 servers. To assess this information, one must monitor the performance of each tier 6, 10, 14, 18 individually in the framework 2 as well as the overall behavior of these tiers. An application health module 16 monitors the resources and data being used by each tier 6, 10, 14, 18 to perform a selected process. This information gathered by the application health module 16 is stored by the server 6, presentation tier 10, middle tier 18, and backend tier 14 to a platform resource 12. The platform resource 12 can include CPU and Memory utilization from tiers 6, 10, 14, 18. Monitoring business transactions that customers initiate requires the correct execution by multiple disparate software technology stacks as well as multiple computer hardware types. Support responsibilities are taken by multiple different engineering teams, each who clearly understand the technology they support. It is important that different technology languages be accounted for so communication between tiers 6, 10, 14, 18 and the platform resource 12 is permitted allowing for monitoring data to be exchanged.

Protocols used by the invention can include one or more standards such as SNMP, CORBA, Java RMI, .NET Remote, Windows Communication Foundation, sockets, UDP, web services or other standard or proprietary protocols. Often middleware is used to connect the separate tiers. Separate tiers often (but not necessarily) run on separate physical servers, and each tier may itself run on a cluster.

The network performance monitoring module 8, application health monitoring module 16, platform source 12, firewall 20, and server 6 send their performance related information to an aggregation presentation module 22. The aggregation presentation module 22 aggregate the information provided and format the information to be presented to an Operations Command Center (OCC) 24 for real time assessment of the system or a user interface-base dashboard 26 to illustrate selected performance analytics of particular interest to a user. The aggregation presentation module 22 can include a remote rule engines to send requests to the platform resource 12 to retrieve selected information to be processed for presentation to the OCC 24 or dashboard 26.

Figure 2:
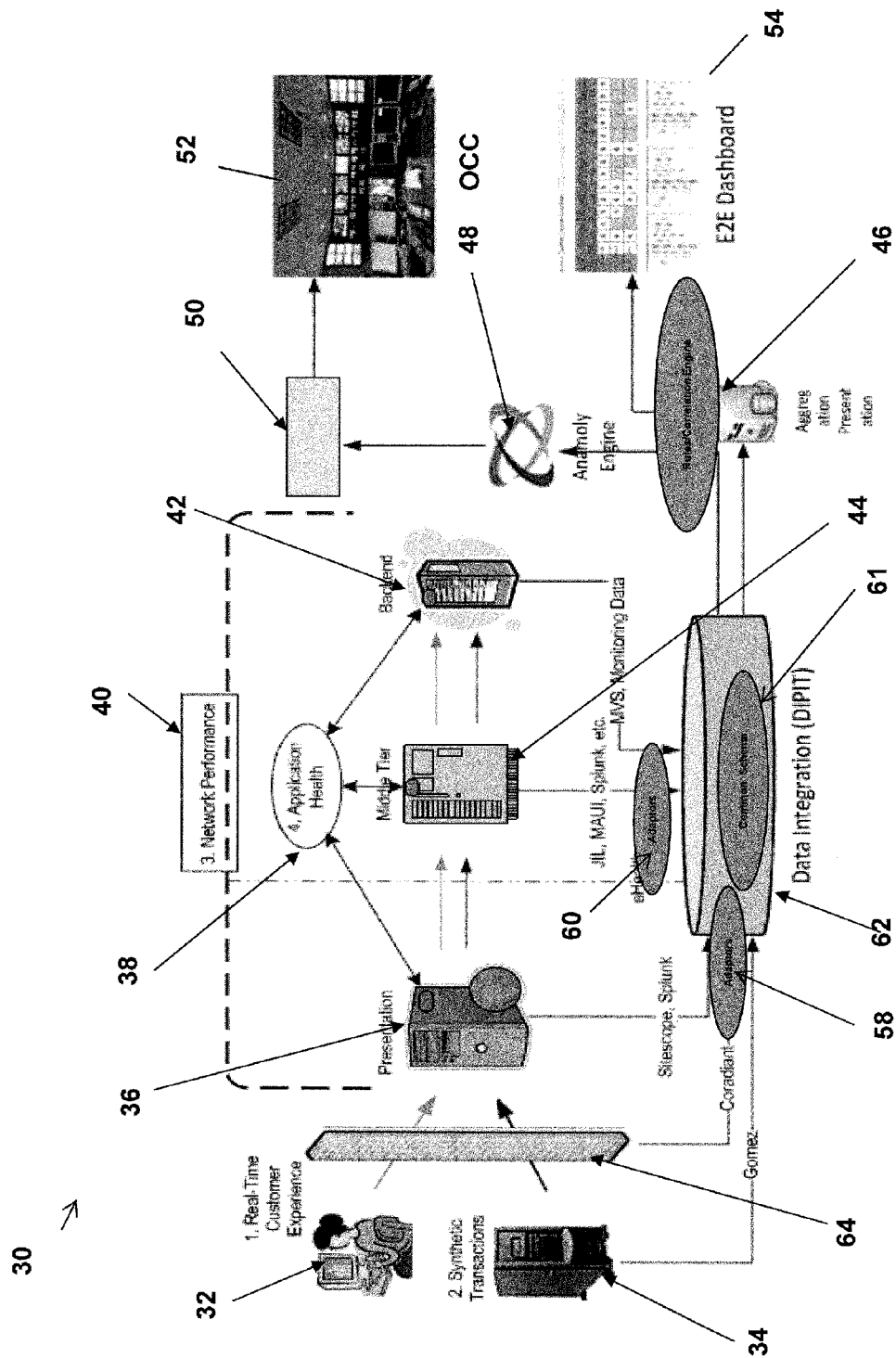
FIG. 2 is a schematic diagram illustrating another embodiment of the invention.

FIG. 2 is a schematic diagram illustrating an embodiment of the invention. A CEM system 30 monitors the interaction in real-time of a customer 32 or synthetic transactions 34 produced by a remote server. Transactions produced by the customer 32 or synthetic transaction 34 are passed thru a firewall 64. The firewall 64 is responsible in protecting the integrity of the information being sent by the customer 32 or the synthetic transactions 34 to a presentation tier 36 as well as load balancing. The presentation tier 36 can include a web server or browser. The customer 32 and synthetic transactions 34 interact with the presentation tier 36 that includes logic to display information to the customer 32 or provide information to the synthetic transactions 34. When the presentation tier 36 determines a service request from the customer 32 or synthetic transactions 34 requiring further processing, the presentation tier 36 sends a request to a middle tier server 44 for further processing.

The middle tier server 44 performs the necessary application functionality needed for detailed processing. The middle tier server 44 can be considered an application server. In particular, the middle tier server 44 is a server that provides software applications with services such as security, data services, transactions support, load balancing, and management of large distributed systems. In certain embodiments of the invention, the middle tier server 44 can be web servers that support the Java Platform, Enterprise Edition; however, its use isn't restricted to Java.

A backend tier 42 is provided that receives requests from the middle tier 44 for managing computer data storage logic. In particular, the backend tier 42 includes database servers where information is stored and retrieved. This tier 42 keeps data neutral and independent from the middle tier server 44. Giving data its own tier improves scalability and performance.

Network performance 40 of this framework 30 depends heavily on the interactions of the presentation tier 36, middle tier 44, and backend tier 42. To assess this information, one must monitor the performance of each tier 34, 36, 44, 42 in the framework 30 as well as the overall behavior of the tiers. An application health module 38 monitors the resources and data being used for by each tier 34, 36, 44, and 42 to perform a selected process. This information gathered in this monitoring process is stored by the tiers 34, 36, 44, 42 and provided to a data integration system 62. Monitoring business transactions that customers initiate requires being able to accommodate for multiple disparate software technology stacks as well as multiple computer hardware types.

Data transfer between tiers 34, 36, 44, 42 requires using protocols such as one or more of SNMP, CORBA, Java RMI, .NET Remote, Windows Communication Foundation, sockets, UDP, web services or other standard or proprietary protocols. Often middleware is used to connect the separate tiers 34, 36, 44, 42. Separate tiers often (but not necessarily) run on separate physical servers, and each tier may itself run on a cluster.

A data integration system 62 includes a database having a common database schema 61, where data is 'normalized' into a format that can be universally recognized by a specific Rules Engine 46. This permits common analysis to be easily performed across data from different technology stacks as well as providing an integrated analysis of the business transaction health. The database schema 61 is broken up into two major components: (1) relationship mapping and (2) metrics. Relationship mapping includes tables defining the relationship between the business transaction and infrastructure (hardware and software assets) with associated monitoring metrics from each of the monitoring tools. The framework 30 allows flexibility of a host to exist in multiple layers and multiple business transactions. In addition, the metrics includes real-time data for each of the metrics defined in the relationship mappings for a given business critical function (BCF) or host (infrastructure). Each metric has one or more baselines defined. The baseline is driven by granularity (week, month, etc.).

The data integration system 62 receives performance information from various hardware and applications. Much of the information is provided to the data integration system 62 via the synthetic transactions 34, firewall 64, presentation tier 36, middle tier 44, and backend tier 42. Each of the tiers 36, 44, 42 have different monitoring stacks that they use to communicate to the date integration system 62, for example, the presentation tier 36 can use Sitescope and Splunk, the middle tier 44 can use MAUI, JIL, and Splunk, and the backend tier 42 can use MVS monitoring data. The data integration system 62 stores these monitoring data that can include performance data of applications and hardware in use.

A Rules/Correlation engine 46 organizes all the data collected from each technology stack retrieved from the data integration system 62 and provides a single health rating for business transactions, and uses logic to analyze collected information from the data integration system 62 in real time. All logs, events, and network flows are correlated together—along with contextual information such as identity, roles, vulnerabilities, and more—to detect patterns indicative of a larger threat using information obtained from the data integration system 62. The Rules/Correlation engine 46 detects known threat patterns or anomalies, requiring constant monitoring. Additionally, organizing the data against a business transaction and not against each technology stack is a new concept. In addition, the Rules/Correlation engine 46 provides a dashboard 54 that offers an overall picture of the health of the network. The dashboard 54 provides information on the activity of a BCF and provides insights about how the various hardware and applications used to execute the BCF are performing. The dashboard 54 allows one to display: (1) BCF; (2) technology layers; (3) status indicators; (4) actual performance; and others.

If it has been determined that certain parameters reached a predefined range of statistical performance an anomaly is triggered by the Rules/Correlation engine 46 and an Anomaly engine 48 further analyzes the information. Performance and availability metrics are collected every 5 minutes, aggregated and stored in the data integration system 62. The current calculated metric is compared to historical baselines and any deviation is determined. Flexibility exists for the baseline to be at different granularities. Business rules applied to determine the health of the BCF by evaluating the magnitude of the deviation. Exceeding threshold by of a selective amount can change how a status indicator is played. The threshold is configurable real-time. Deviations are detected from baseline performance metrics and are used to set status indicators. If there is no data collected during a sample period, the metric will be grayed out. The Anomaly engine 48 is activated when an anomaly is found and determines the extent of the anomaly that has been detected and processes the information so the OCC 52 can use the information to address the anomaly via a monitoring module 50. The monitoring module 50 offers a single interface to monitor, manage, and control a global IT infrastructure. The monitoring module 50 is a tightly integrated platform of tools that transforms data into knowledge and creates a high degree of process efficiencies that minimize system impact, application impact, and most importantly customer impact.

Note data from all sources can be included via adapters 58 and 60. The adapters 58 and 60 can be written in a native technology language for the stack, which collects the data. This then translates the data into discrete elements that are mapped into the database schema used by the data integration system where a common database schema for the data is used.

Figure 3:
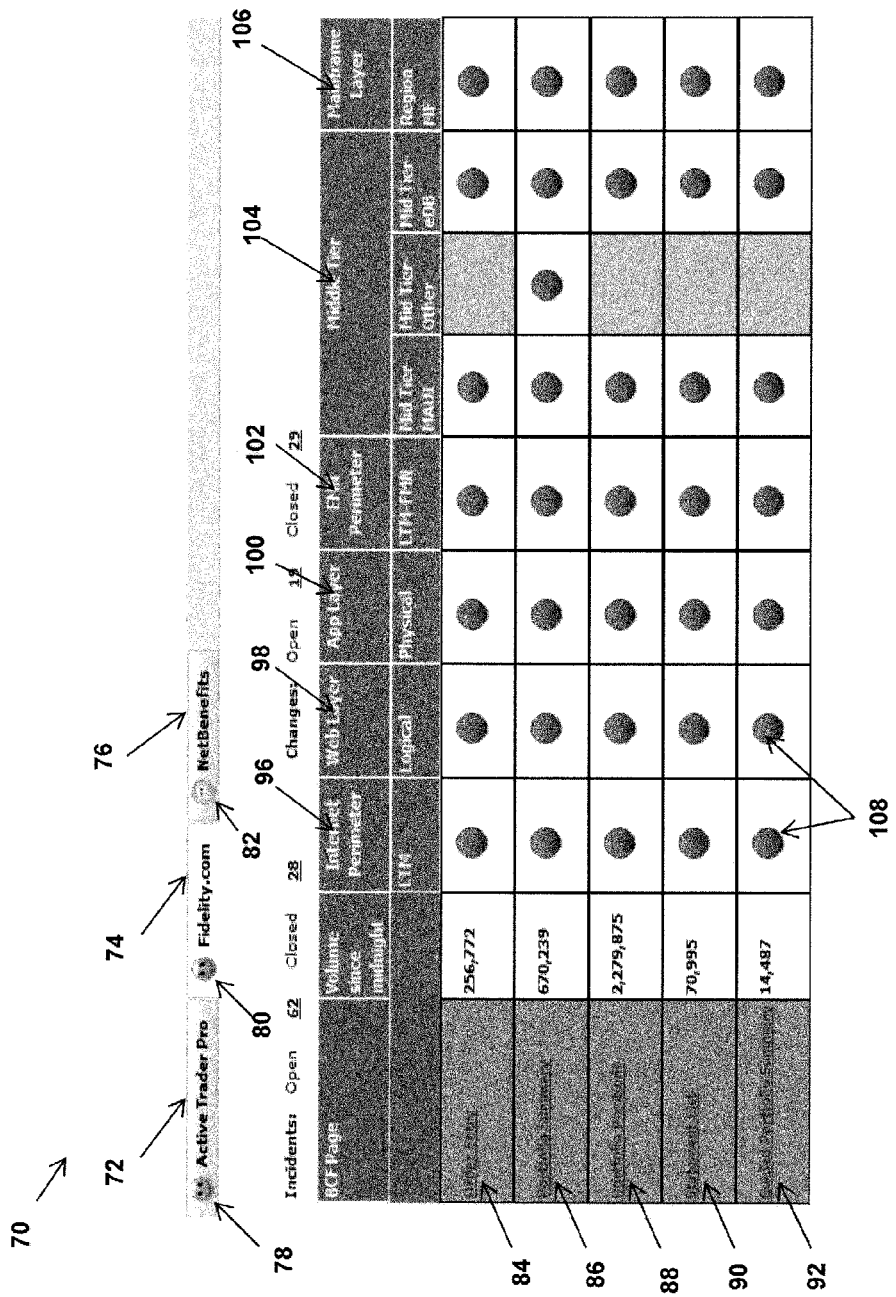
FIG. 3 is a schematic diagram illustrating the CEM providing an interface for end-to-end view of the status of all application software and technology hardware resources used in a business transaction.

FIG. 3 shows a CEM system 70 providing an end-to-end view of the status (health) of all application software and technology hardware resources used to service a BCF. The CEM 70 includes an interface that can be easily used and relevant because of the information it provides. The CEM 70 is organized around the concepts of containers 72, 74, and 76 and business critical functions (BCFs) 84, 86, 88, 90, and 92. At the top-level, each container (or product) is shown as its own tab. The products or containers shown here are 'Active Trader Pro' 72, 'Fidelity.com' 74 and 'NetBenefits' 76.

Each container 72, 74, and 76 has an overall customer experience rating as denoted by various indicators 78, 80, and 82, such as facial expressions and colors. This rating is calculated as a function of whether any of the individual metrics configured for the BCF have deviated beyond the pre-configured thresholds. A business transaction is defined by the BCF nomenclature. An example of a Fidelity BCF is the portfolio summary page 86 under Fidelity.com. Used by customers to view their financial holdings, this transaction traverses six different technology layers before being successfully delivered to the customer. Layers are->1) Internet perimeter or (firewall) 96 2) web layer 98 3) application layer 100 4) FMN perimeter or transaction routing layer 102 5) middle tier (MAUI services layer and other mid-tiers) 104, and finally 6) MVS mainframe layer 106. Note each layer 96, 98, 100, 102, and 104 include indicators 108 illustrating the overall performance of each layer. A user can click the portfolio summary 86 to drill down to a BCF detail screen of the portfolio summary as an example.

Figure 4:
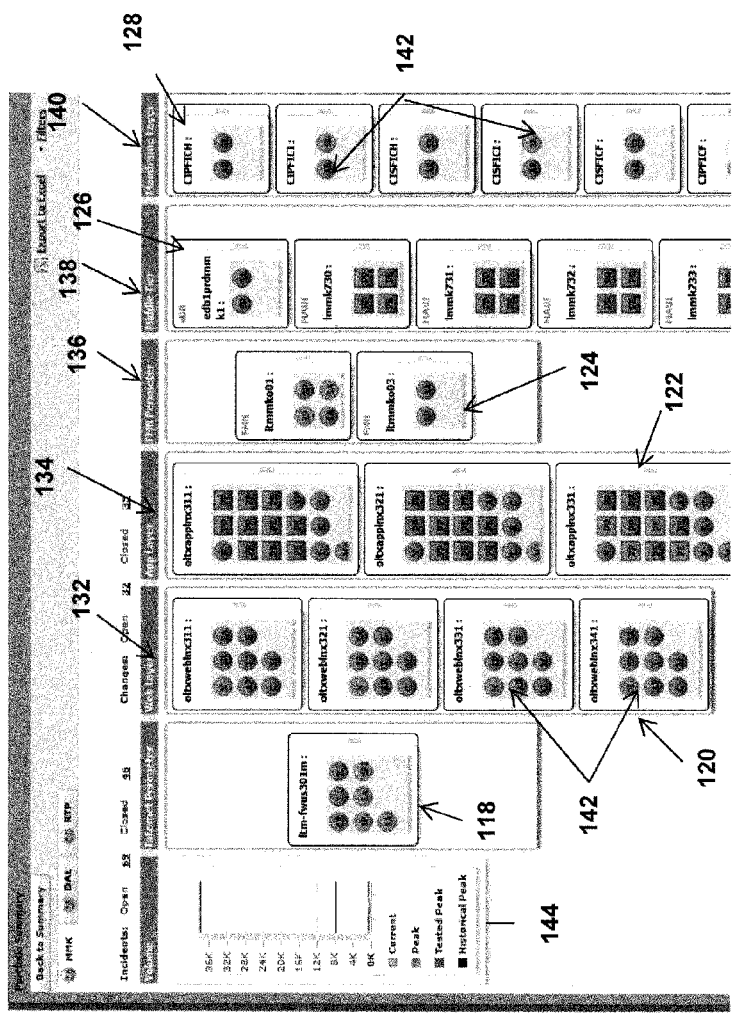
FIG. 4 is a schematic diagram illustrating another CEM used in accordance with the invention.

FIG. 4 shows a CEM 116 used in accordance with the invention. In this case, the CEM 116 is for the portfolio summary for Fidelity.com. The CEM 116 shows tabs 118, 120, 122, 124, 126, and 128 are displayed for each physical location 132, 134, 136, 138, and 140 in the distributed environment. In addition, the CEM 116 arranges sites 142 in the order of worst indicators to the best, the sites having the worst indicators come first. One can then navigate to the other sites/tabs if desired. Volume metrics 144 specific to each BCF are also displayed at the far left side of the page. In addition to the current volume, peak volume for the day, historical peak, and capacity tested peak volumes are shown.

The CEM 70 collects, aggregates, analyzes and presents health metrics of the BCF at 5-minute intervals. Different health indicators are presented at each status interval. For containers 72, 74, and 76 having predictably worrisome statuses, by clicking to this BCF detail screen 116 allows the operator to see where in the transaction path the concern should be focused.

Within each layer 132, 134, 136, 138, and 140, each tab 118, 120, 122, 124, 126, and 128 have a site 142 associated with a specific hardware asset. Within each hardware component, by clicking on one of the sites 142 more detailed specific metrics 150 regarding the site 142 are provided, as show in FIG. 5. One can mouse over the various metrics 152 displayed, the full name of the metric, the most recent measurement and its data source are displayed in area 154.

Figure 5:
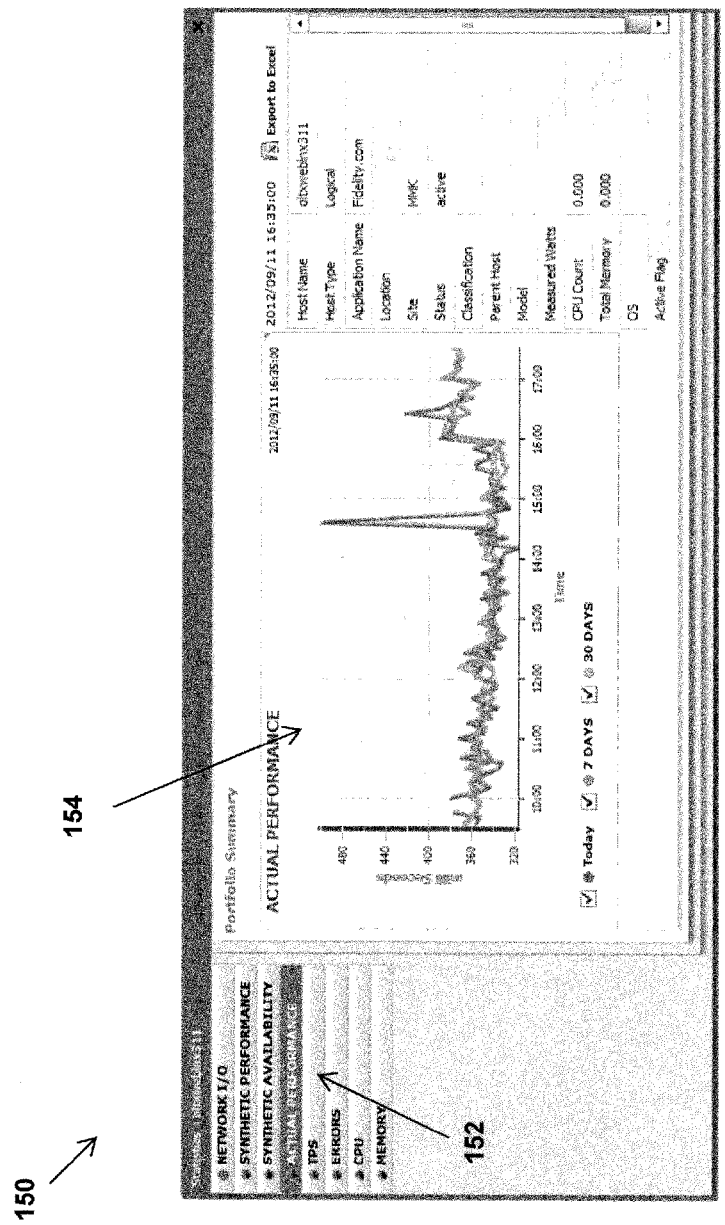
FIG. 5 is a schematic diagram illustrating a screen providing detailed metric of hardware component used in accordance with the invention.

FIG. 5 shows data for a specific metric being trended for today but also overlays the results against both the 7 and 30-day baselines. This can help the operator understand whether the results are part of a new trend or just something of a minor shift. The anomaly detection engine 48 determines when deviations are detected from baseline performance metrics and is used to set the status indicators.

All software programs and system applications described herein are platform independent and can execute in any browser such as Firefox®, Internet Explorer®, or Chrome®. The web applicant can also be written in any platform independent-based computer language, such as Java or the like. All software programs and system applications execute on a client computer using a processor or the like. All software programs and system applications can be stored in the RAM or ROM of the client. Furthermore, all software programs and system applications can be stored on an external memory device to be uploaded to the client computer for execution. The elements associated with all software programs and system applications can be executed from the client computer or on a remote server. All database servers can be local on the client computer or on a remote server, as well as on a system remote from either the client computer or remote server. The client computer, remote server, and database servers communicate to each other using known communication protocols, such as TCP/IP.

This invention provides a single integrated view to the end-to-end technology health of a business transaction. It integrates and correlates data from multiple sources to provide a single status. A consolidated end-to-end graphical view of a business transaction and the technology it traverses is displayed to Operations personnel and proactive status of any beginning issues are displayed for research.

Although the present invention has been shown and described with respect to several preferred embodiments thereof, various changes, omissions and additions to the form and detail thereof, may be made therein, without departing from the spirit and scope of the invention.

What is claimed is:

1. A network monitoring system comprising:
    a plurality of tiers being arranged in a network having a plurality of hardware and software resources for executing a selective number of applications, the tiers including disparate technology stack formats;
    a platform resource that regularly requests monitoring information from the tiers in their respective disparate technology formats where the monitoring information is normalized into a format that is universally recognized, said monitoring information comprises resources and data being used by each tier of said network to perform a selected process, wherein an application health module monitors said resources and data for each tier of said network to assess performance of said network; and
    an aggregation presentation module that aggregates and analyzes the monitoring information from the platform resource to determine if there are any anomalies of the hardware and software resources, and formats the monitoring information to be presented as selected real-time performance analytics to a user by normalizing the monitoring information into a format that can be universally recognized by a rules engine permitting common analysis to be easily performed across data from different technology stacks, wherein a data integration module stores the normalized data used by the rules engine so as to define relationships between transactions and metrics associated with the hardware and software resources of each of the tiers.

2. The networking monitoring system of claim 1, wherein the tiers comprise a presentation tier, middle tier, and backend tier.

3. The networking monitoring system of claim 2, wherein the presentation tier comprises a web server or browser.

4. The networking monitoring system of claim 2, wherein the middle tier comprises an application server or a plurality of web servers.

5. The networking monitoring system of claim 4, wherein the backend tier manages the computer storage logic of the middle tier.

6. The networking monitoring system of claim 1, wherein the aggregation presentation module comprises a rule engines that allows for common analysis to be performed across the disparate technology stacks.

7. The networking monitoring system of claim 6, wherein the aggregation presentation module comprises an anomaly engine that is activated when the rule engines determines an anomaly exists and the anomaly engine further analyzes the information and formats the information to be presented for review by a full service center.

8. The networking monitoring system of claim 1, wherein the selected real-time performance analytics are presented in dashboard format for use by the user.

9. The networking monitoring system of claim 1, wherein the platform resource utilizes one or more adaptors that regularly request and then translate the monitoring information provided by the tiers into discrete elements that are mapped into the database schema used by the platform resource.

10. A method of performing network monitoring comprising:
    arranging a plurality of tiers in a network having a plurality of hardware and software resources for executing a selective number of applications, the tiers including disparate technology stack formats;
    receiving monitoring information from the tiers in their respective disparate technology formats where the monitoring information is normalized into a format that is universally recognized, said monitoring information comprises resources and data being used by each tier of said network to perform a selected process, wherein an application health module monitors said resources and data for each tier of said network to assess performance of said network by normalizing the monitoring information into a format that can be universally recognized by a rules engine permitting common analysis to be easily performed across data from different technology stacks;
    aggregating and analyzing the monitoring information stored in the platform resource using an aggregation presentation module to determine if there are any anomalies of the hardware and software resources,
    formatting the monitoring information to be presented as selected real-time performance analytics to a user; and
    storing the normalized data used b the rules engine so as to define relationships between transactions and metrics associated with the hardware and software resources of each of the tiers.

11. The method of claim 10, wherein the tiers comprise a presentation tier, middle tier, and backend tier.

12. The method of claim 11, wherein the presentation tier comprises a web server or browser.

13. The method of claim 11, wherein the middle tier comprises an application server or a plurality of web servers.

14. The method of claim 13, wherein the backend tier manages the computer storage logic of the middle tier.

15. The method of claim 10, wherein the aggregation presentation module comprises a rule engines that allows for common analysis to be performed across the disparate technology stacks.

16. The method of claim 15, wherein the aggregation presentation module comprises an anomaly engine that is activated when the rule engines determines an anomaly exists and the anomaly engine further analyzes the information and formats the information to be presented for review by a full service center.

17. The method of claim 10, wherein the selected real-time performance analytics are presented in dashboard format for use by the user.

18. The method of claim 10, wherein the platform resource utilizes one or more adaptors to translate the monitoring information provided by the tiers into discrete elements that are mapped into the database schema used by the platform resource.

* * * * *